Sept. 17, 1968      K. A. BOYD      3,401,569
CONTROL LINKAGE
Filed March 21, 1966
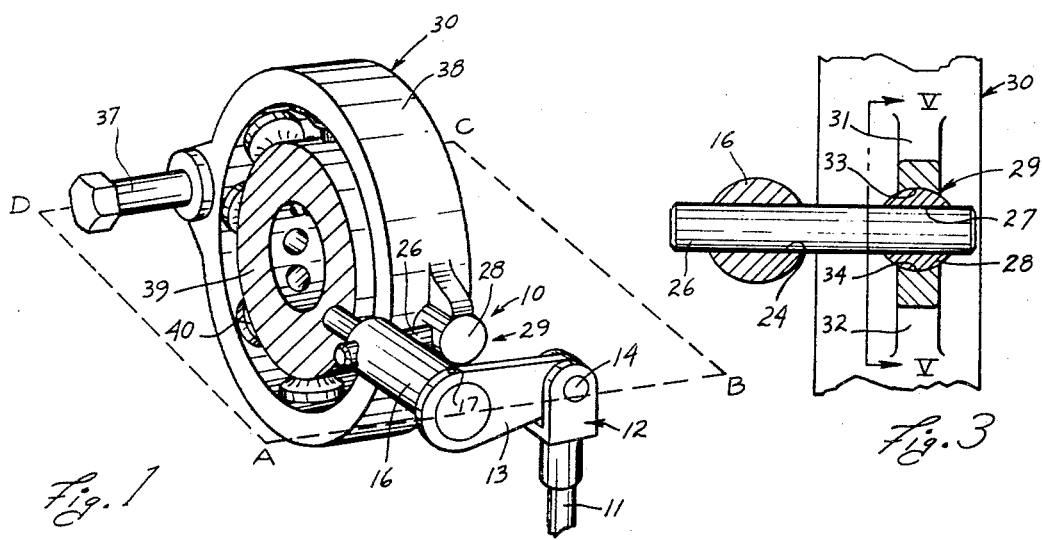
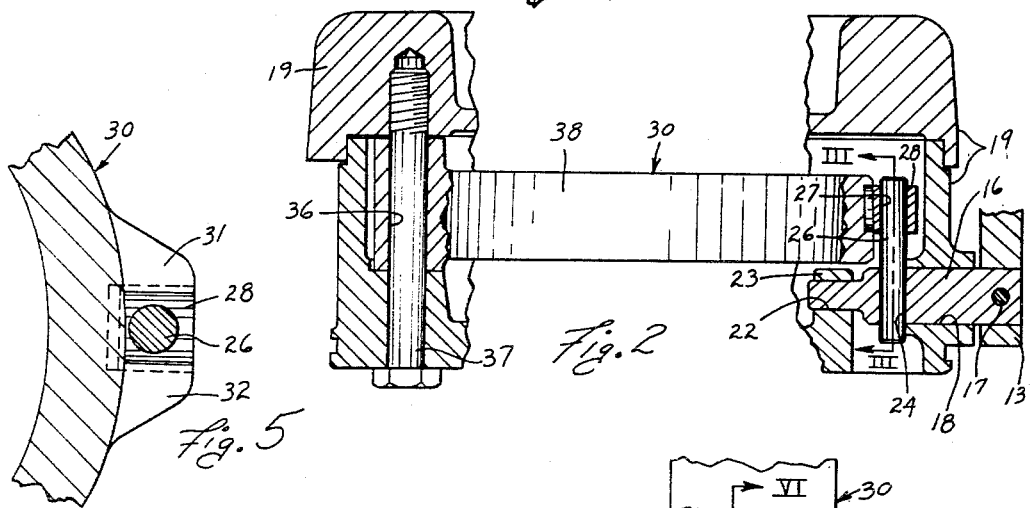
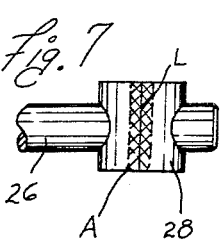
INVENTOR
KEITH A. BOYD
BY
Woodhams, Blanchard & Flynn
ATTORNEYS United States Patent Office 3,401,569
Patented Sept. 17, 1968

3,401,569
CONTROL LINKAGE
Keith A. Boyd, Mount Clemens, Mich., assignor to Eaton Yale & Towne Inc., Cleveland, Ohio, a corporation of Ohio
Filed Mar. 21, 1966, Ser. No. 536,009
7 Claims. (Cl. 74—96)

ABSTRACT OF THE DISCLOSURE

A linkage system for transferring oscillatory motion in a first plane to oscillatory motion in a second plane transverse to said first plane and including first and second oscillatable levers in said first and second planes, respectively, and having a cylinder-and-socket joint connected in association with the free ends of said first and second levers.

---

This invention relates to a linkage for converting oscillatory motion in one plane to oscillatory motion in a second plane transverse of the first plane, and more particularly, relates to a control linkage for remotely controlling, including by manual means, a radial piston type pump.

This linkage was developed in conjunction with the development of a radial-piston pump and remote control means for controlling same, particularly for the use of such a pump in driving a vehicle. However, the use of this linkage is not intended to be limited to the control of radial-piston type pumps or to the use of same in a vehicle. It is intended to be used in many kinds of widely varying apparatus in which oscillatory motion in one plane is to be transferred to oscillatory motion in another plane under conditions requiring a high degree of accuracy.

The control of radial-piston pumps by movement of an eccentric ring about a pivot axis is very critical in some instances of application, such as a radial-piston pump used to control the speed of a hydraulic motor and disclosed in Ser. No. 527,375 assigned to the same assignee as the present application. It is important that there be no lost motion so that the speed of the hydraulic motor can be accurately controlled. This is especially important for obvious reasons where the pump is used to drive a vehicle and is particularly critical since in a radial piston pump only a small movement of the eccentric ring will produce a wide change in the output of the pump.

Hence, this linkage was developed in an attempt to find a control means for a radial-piston pump which would be durable, resistant to wear and would thereby accept and maintain a high level of accuracy of control. It will be apparent that with a wide output variation resulting in a radial-piston pump, because of a small change in position of the eccentric ring, the appearance of loose connections in the linkage system is wholly unacceptable. The ball-and-socket type joints are not satisfactory because the force transmitted through the joint is essentially transmitted through a point. Thus, the surface on the ball is subject to an appreciable wear which eventually results in inaccuracies between the ball and the socket and consequent erratic performance of the pump.

Therefore, it is an object of this invention to provide a linkage which is of simple construction and permits oscillatory motion in one plane to be transferred to a transverse plane.

It is a further object of this invention to provide a linkage which is durable and resistant to wear.

It is a further object of this invention to provide a linkage system which is easy to manufacture.

It is a further object of this invention to provide a linkage system which is inexpensive to manufacture.

It is a further object of this invention to provide a linkage system in which the force transmitted from the linkage to the part to be moved acts through a line rather than a point, and thereby minimize wear and consequent lost motion in the linkage system.

It is a further object of this invention to provide a linkage system which will maintain a high level of accuracy in operation regardless of severe operating conditions.

Other objects and purposes of this invention will become apparent to those familiar with this type of apparatus and upon examining the accompanying specification and drawings.

In the drawings:

FIGURE 1 is a perspective view of a linkage embodying the invention illustrated in use with a pivotally mounted ring, such as the type used in radial-piston pumps, in which the details of the housing have been deleted.

FIGURE 2 is a top view, partially sectioned, of the linkage embodying the invention taken on the section plane ABCD in FIGURE 1.

FIGURE 3 is a sectional view taken on line III—III in FIGURE 2.

FIGURE 4 is a view similar to FIGURE 3 with the linkage swung to a different position.

FIGURE 5 is a partial sectional view taken on line V—V in FIGURE 3.

FIGURE 6 is a view similar to FIGURE 5 with the ring member pivoted to a different position and showing in an exaggerated manner the shift in position of part of the driving linkage relative to the means controlled thereby.

FIGURE 7 is a view of the cylinder portion of a cylinder-and-socket joint illustrating the line through which the force acts and the area covered by the line due to the complex motion of the cylinder.

GENERAL DESCRIPTION

The objects and purposes above discussed have been met by providing a linkage system comprising a shaft, a connecting member and a cylinder-and-socket joint, all serially connected to each other and thence to the free end of a pivoted lever member.

DETAILED DESCRIPTION

In the embodiment here selected to illustrate the invention, there is provided a linkage system 10 (FIGURE 1), which comprises a remotely controlled rod 11 having a bifurcated end portion 12 for receiving one end of an arm 13 therebetween and is pivotally secured thereto by a pin 14. The other end of the arm 13 is secured to one end of the shaft 16 by a pin 17 (FIGURE 2). The shaft 16 is mounted in an opening 18 in the housing 19 and made pivotal with respect thereto. The other end of the shaft 16 is rotatably anchored in an opening 22 in the web portion 23 of the housing 19. An opening 24 extends transverse of the axis of the shaft 16 and is designed to receive one end of the connecting member 26 which is rigidly secured therein by any conventional means, but preferably by means of a press fit.

The other end of the connecting member 26 is slideably received within an opening 27 in a solid cylindrical member 28 transverse of its axis. The cylinder 28 is disposed within a socket 29 positioned at the free end of a controlled part 30 which is pivotable about the axis of a bolt 37 passing through the opening 36 in the other end of the controlled part. Thus, the axis of movement of the shaft 16 is fixed with respect to the axis of movement of said controlled part 30. The controlled part 30 is shown in FIGURES 1 and 2 to be a cam ring 38 used in the control of a radial-piston pump having a cylinder block 39 rotatable therein and carrying pistons 40. However, this particular illustration of use is not in any way intended to limit the scope of the invention. Therefore, since the part 30 behaves, for all practical purposes, the same as a pivoted lever arm, the controlled part 30 will hereinafter for convenience be referred to as a lever in both the specification and claims.

The socket 29 is formed by a pair of bosses 31 and 32 extending outwardly from the free end of the lever 30. The inner facing surfaces 33 and 34 are arcuately shaped to conform to the diameter of the cylinder 28. The purpose of this construction will become apparent.

OPERATION

The linkage system is impelled by a rod 11 which reciprocates up or down on command from a remote source of force, not shown, but which may, for example, be the foot pedal of a vehicle in which the pump provides the motive power. For purposes of illustrating the operation of the linkage system, it will be assumed that a command has been given to the system which moves the rod 11 upwardly. The arm 13 will be pivoted counterclockwise about the axis of the shaft 16. This in turn will cause the outer end of the connecting member 26 to swing upwardly from the FIGURE 3 position to the FIGURE 4 position. This motion will cause the cylindrical member 28 to rotate counterclockwise about its axis in the socket 29 because of the connecting member 26 connected thereto causing the openings 24 and 27 to remain axially aligned. The cylindrical member 28 will also rotate counterclockwise from the FIGURE 5 to the FIGURE 6 position with respect to the connecting member 26 slideable therethrough.

As the lever 30 moves counterclockwise, the free end of the lever moves leftwardly with respect to the cylindrical member 28 (FIGURE 6). This results also in a relative outwardly sliding motion of the cylindrical member 28 from the FIGURE 5 position to the FIGURE 6 position with respect to the lever 30.

It will be evident from the foregoing and reference to the drawing that oscillatory motion of the arm 13 in a first plane about the axis of the shaft 16 will cause oscillatory motion of the lever 30 in a second plane about the axis of the bolt 37, said first plane being transverse of said second plane.

The cylinder-and-socket connection provides a large surface for resisting friction forces and thereby reducing wear, which is very prevalent in the ball-and-socket type joints because of the small surface resisting wear. That is, the complex motion of the cylinder 28 within the socket 29 causes the line L through which the force acts to move and define a large surface A illustrated in FIGURE 7.

The cylinder-and-socket connection is very advantageous in the control of radial-piston pumps, for example, because the control of the ring 38 about the pivot axis is very critical and there cannot be a loose fit of the cylinder within the socket resulting in lost motion and consequent inaccuracy of control. Since wear in the cylinder-and-socket joint of this invention is less than most known socket-type connections due to the greater area through which the force acts, the accuracy of control over the lever 30 or ring 38 is greatly enhanced over a longer period of time.

Although a particular preferred embodiment of the invention has been disclosed above in detail for illustrative purposes, the invention contemplates such changes and modifications therein as lie within the scope of the appended claims.

The embodiments of the invention in which an exclusive property or privilege is claimed are defined as follows:

1. A linkage system for transferring oscillatory motion in a first plane to oscillatory motion in a second plane, comprising in combination:
   a shaft having its axis substantially perpendicular to said first plane for receiving said motion in said first plane and means rotatably supporting same;
   means defining a pivotally mounted lever oscillatable in said second plane and having a pivot axis fixed with respect to said axis of said shaft, said second plane being transverse of said first plane;
   a connecting member arranged parallel to said first plane having one end rigidly secured to said shaft and rotatable therewith;
   means defining a cylinder-and-socket joint, one part thereof being on the free end of said lever and the other part thereof connected to the other end of said connecting member;
   whereby oscillatory motion of said shaft will cause said cylinder to rotate in said socket about its axis, slide axially in said socket as well as oscillate about the pivot axis of said lever causing said lever to oscillate.

2. A device as defined in claim 1, wherein said shaft is perpendicular to said axis of said lever.

3. A device as defined in claim 1, wherein when said free end of said lever is at the centerpoint of its path of movement, said connecting member is disposed parallel to the axis of movement of the lever.

4. A device as defined in claim 1, wherein said socket is on said free end of said lever and said cylinder is connected to said other end of said connecting member.

5. A device as defined in claim 1, wherein said free end of the lever is at the centerpoint in its path of movement, the axis of said lever is parallel with the axis of said shaft.

6. A device as defined in claim 4, wherein said connecting member is slideably related to said cylinder.

7. A device as defined in claim 4, wherein said cylinder is positioned with its central axis perpendicular to the axis of pivoting of said lever, wherein said connecting member is, when in its center position, parallel to said last-named axis and perpendicular to said cylinder axis, wherein said cylinder is axially slideably in said socket and wherein said connecting member is axially slideably through, and radially of, said cylinder.

References Cited

UNITED STATES PATENTS

| 957,474 | 5/1910 | Parkes | 74—96 |
| 2,512,380 | 6/1950 | Quartullo | 74—96 |
| 3,267,752 | 8/1966 | Hauser-Bucher | 74—96 |

FOREIGN PATENTS

| 790,650 | 2/1958 | Great Britain. |

FRED C. MATTERN, JR., *Primary Examiner.*

W. S. RATLIFF, *Assistant Examiner.*